(12) United States Patent
Marsh (10) Patent No.: US 7,831,916 B2
(45) Date of Patent: Nov. 9, 2010

(54) METHOD, SYSTEM, AND PROGRAM FOR CREATING, RECORDING, AND DISTRIBUTING DIGITAL STREAM CONTENTS

(75) Inventor: Brian Marsh, Tokyo (JP)

(73) Assignee: Fry-Altec, LLC, Westlake Village, CA (US)

( * ) Notice: Subject to any disclaimer, the term of this patent is extended or adjusted under 35 U.S.C. 154(b) by 1891 days.

(21) Appl. No.: 10/472,265

(22) PCT Filed: Jun. 13, 2002

(86) PCT No.: PCT/JP02/05917

§ 371 (c)(1),
(2), (4) Date: Sep. 16, 2003

(87) PCT Pub. No.: WO02/104036

PCT Pub. Date: Dec. 27, 2002

(65) Prior Publication Data

US 2004/0125129 A1    Jul. 1, 2004

(30) Foreign Application Priority Data

Jun. 15, 2001   (JP)  .............................. 2001-181661

(51) Int. Cl.
G06F 3/00 (2006.01)
H04J 3/24 (2006.01)
G06F 15/16 (2006.01)
G06F 17/00 (2006.01)

(52) U.S. Cl. ........................ 715/751; 715/203; 715/753; 709/205; 709/219; 709/231; 370/473; 370/474

(58) Field of Classification Search .................. 715/751, 715/753, 203; 709/205, 219, 231; 370/473, 370/474
See application file for complete search history.

(56) References Cited

U.S. PATENT DOCUMENTS 5,613,032 A   3/1997   Cruz et al.

(Continued)

FOREIGN PATENT DOCUMENTS

JP   9-510852   10/1997

(Continued)

OTHER PUBLICATIONS

Office Action on Japanese Foreign Filing (Japanese), Mar. 31, 2004, 2 pages.

(Continued)

Primary Examiner—Hoang-Vu A Nguyen-Ba
(74) Attorney, Agent, or Firm—SoCal IP Law Group LLP; Steven C. Sereboff; John E. Gunther (57) ABSTRACT

There is provided a method of creating a digital stream contents to be distributed via a network from an input stream signal such as a video signal and an audio signal with a simple operation. A new moving image file is created every time a "NEW" button is clicked at such as a point where scenes of an image switch, and a moving image data from such point until the "NEW" button is clicked again is stored in the moving image file. Further, a speaker name and a slide file name of each scene may be obtained from a file which is prepared separately, and recorded in an administration file in relation with a corresponding moving image file name and a time code. The moving image file may however be a single file which is not separated for every scene.

25 Claims, 8 Drawing Sheets

U.S. PATENT DOCUMENTS

| | | | |
|---|---|---|---|
| 5,737,552 A | | 4/1998 | Lavallee et al. |
| 5,765,164 A | | 6/1998 | Prasad et al. |
| 6,108,728 A | * | 8/2000 | Kobayashi .................. 710/74 |
| 6,195,091 B1 | * | 2/2001 | Harple et al. ............... 715/751 |
| 7,134,074 B2 | * | 11/2006 | Munetsugu et al. ......... 715/204 |
| 7,675,939 B2 | * | 3/2010 | Kawamura et al. .......... 370/469 |
| 2001/0052019 A1 | * | 12/2001 | Walters et al. ............. 709/231 |
| 2005/0210393 A1 | * | 9/2005 | Maeng ...................... 715/751 |

FOREIGN PATENT DOCUMENTS

| | | |
|---|---|---|
| JP | 2000-175139 | 6/2000 |
| WO | WO 96/08107 | 3/1996 |
| WO | WO 97/41504 | 11/1997 |
| WO | WO 99/21364 | 4/1999 |
| WO | WO 00/28731 | 5/2000 |
| WO | WO 00/54223 | 9/2000 |

OTHER PUBLICATIONS

Office Action on Japanese Foreign Filing—English Translation, Mar. 31, 2004, 2 pages.
European Patent Office Search Report, U.S. Appl. No. 10/472,265, Search Report dated Aug. 15, 2002.
PCT International Search Report mailed Aug. 23, 2002.
Office Action on Japanese Foreign Filing (Japanese), Nov. 2, 2004, 2 pages.
Office Action on Japanese Foreign Filing—English Translation, Nov. 2, 2004, 2 pages.
Written opinion of Australian Patent Office dated Jan. 20, 2004.
Office Action on Chinese Foreign Filing Chinese), Feb. 18, 2005, 4 pages.
Office Action on Chinese Foreign Filing—English Translation, Feb. 18, 2005, 5 pages.

* cited by examiner

Jimmy Joe Bob

Tony Kranducci

Joey Tranducci

Maucus Rodgers

Eric Feigenbaum

Masa Yamagiwa

Jimmy Joe Bob

FIG. 4

Jimmy Joe Bob, Slide_A, Slide_G

Tony Kranducci, Slide_B

Joey Tranducci, Slide_C

Maucus Rodgers, Slide_D

Eric Feigenbaum, Slide_E

Masa Yamagiwa, Slide_F

FIG. 5

```xml
<?xml version="1.0"?>
<session>
    <settings>
        <type>noevents</type>
        <format>RealMedia</format>
        <recdate>5_17_2001</recdate>
    </settings>
    <event>
        <filename>conf_1</filename>
        <timecode>00:00:10</timecode>
        <speaker>Jimmy Joe Bob</speaker>
        <slidetitle>Slide_A</slidetitle>
    </event>
    <event>
        <filename>conf_2</filename>
        <timecode>00:01:25</timecode>
        <speaker>Tony Kranducci</speaker>
        <slidetitle>Slide_B</slidetitle>
    </event>
    <event>
        <filename>conf_3</filename>
        <timecode>00:04:03</timecode>
        <speaker>Joey Tranducci</speaker>
        <slidetitle>Slide_C</slidetitle>
    </event>
    <event>
        <filename>conf_4</filename>
        <timecode>00:06:52</timecode>
        <speaker>Maucus Rodgers</speaker>
        <slidetitle>Slide_D</slidetitle>
    </event>
    <event>
        <filename>conf_5</filename>
        <timecode>00:09:15</timecode>
        <speaker>Eric Feigenbaum</speaker>
        <slidetitle>Slide_E</slidetitle>
    </event>
    <event>
        <filename>conf_6</filename>
        <timecode>00:10:59</timecode>
        <speaker>Masa Yamagiwa</speaker>
        <slidetitle>Slide_F</slidetitle>
    </event>
    <event>
        <filename>conf_7</filename>
        <timecode>00:12:20</timecode>
        <speaker> Jimmy Joe Bob</speaker>
        <slidetitle>Slide_G</slidetitle>
    </event>
</session>
```

METHOD, SYSTEM, AND PROGRAM FOR CREATING, RECORDING, AND DISTRIBUTING DIGITAL STREAM CONTENTS

TECHNICAL FIELD

The present invention relates, to a method, a system or a computer program for creating digital stream contents such as a moving image data or an audio data from a stream signal such as a video signal or an audio signal, and also relates to a storage medium recording such program. The present invention also relates to a method for distributing the digital stream contents created by the above method.

BACKGROUND ART

With the recent trend of broadband in connecting to the Internet, it is becoming common to distribute various moving image data via the Internet, and for example, there exists a web site distributing a video image captured from scenes of such as a briefing of account settlement. As a data format of moving images distributed via the Internet, for example, formats such as Real Media or Windows Media™ are generally used. When creating such moving image data conventionally, first a briefing of account settlement or the like to be captured is recorded on video, and from such captured signals moving image files of a desired portion is created by an editing software corresponding to the format of the moving image data to be created, then editing is performed by appropriately rearranging the order of these files.

In such a case, with a conventional editing software, every time the respective moving image files are created, setting of various conditions such as bandwidth, image quality, and speech quality, and inputting of file names are required. Therefore, in such a case that editing is to be conducted by dividing the inputted video signals into multiple moving image files, an extremely large amount of time will be required for the editing operation. For such a reason, an extensive amount of time will be required from when an image is recorded until a moving image is distributed, and thus a prompt moving image distribution cannot be accomplished.

DISCLOSURE OF INVENTION

Thus, an object of the present invention is to provide a digital stream contents creating method which can create digital stream contents to be distributed via a network with an easy operation from an input stream signal such as a video signal or a speech signal, a digital stream contents creating system, a digital stream contents creating program, a storage medium recording such program, and a distributing method of the digital stream contents created by the above method.

In order to achieve the above object, a method of creating digital stream contents from an input stream signal by using an encoding means having a function to encode a stream signal into a digital stream data comprises:

in accordance with predetermined operations, generating a new data file, and recording in the generated data file a digital stream data obtained by encoding the input stream signal by the encoding means from the time of the predetermined operation until an occurrence of the subsequent predetermined operation; and recording identifying information of the generated data file in order of its generation in an administration file.

According to the invention, when a predetermined operation is conducted, a new data file is created every time, and this data file is recorded with a digital stream data until the next operation is conducted. Further, an identifying information of each data file is recorded in an administration file according to its generated order. Therefore, for example, by conducting the predetermined operation at such as a timing when a scene of an input stream signal switches, a digital stream data file corresponding to each scene may be easily generated, and an identifying information of each data file (for example, a file name) may be recorded in the administration file according to the generated order of files. Incidentally, if identifying information of such as a data file including stream contents to be distributed and file names of each file are provided, distribution in the network of digital stream contents may be conducted. Therefore, according to the present invention, digital stream contents which may be distributed in the network can be created by a simple operation.

Note that, in this specification, the definition of "stream" in regards to a stream signal, a digital stream data, and a digital stream contents, includes the meaning of having an element which changes as time passes such as a moving image or a speech.

The method of the invention may further comprise recording identifying information of an object data to be shown in synchronization with the proceeding of the input stream signal, in relation with identifying information of a corresponding data file, in the administration file. In this case, an identifying information of an object which should be shown in synchronization with the proceeding of the inputted stream signal, in relation to an identifying information of a data file to record the digital stream data, is recorded in the administration file. As a result, the object data may be distributed in synchronization with the digital stream data.

Further, a method of creating digital stream contents from an input stream signal by using an encoding means having a function to convert a stream signal to a digital stream data comprises:

generating a data file, and recording the digital stream data obtained by encoding the input stream signal by the encoding means in the generated data file;

in accordance with a predetermined operation, obtaining a time code at a time of the predetermined operation,; and recording the obtained time code in an administration file.

According to the invention, when a predetermined operation is conducted, a time code at such point in time is obtained. Then, each obtained time code is recorded in the administration file. Therefore, for example, by conducting the predetermined operation at such as a timing when a scene of the inputted stream signal switches, the time code at the point of switching of each scene may be recorded in the administration file. Incidentally, if a time code of a digital stream data is provided, the contents data of a point in time relevant to such time code may be extracted and such portion may be distributed, so that if there is an administration file recording the time code of the point of switching scenes as above, the digital stream contents may be distributed in the order according to such contents. Thus, according to the present invention, a digital stream contents which may be distributed in a network may be created by a simple operation.

The method of the invention may further comprise recording identifying information of an object data to be shown in synchronization with the proceeding of the input stream signal, in relation with a corresponding time code, in the administration file. In this case, an identifying information of an object to be shown in synchronization with the proceeding of the inputted stream signal is recorded, in relation to each time code. As a result, the object data may be distributed in synchronization with the digital stream data.

The method of the invention may further comprise sending the administration file and the data file to a predetermined distribution server.

Further, a method of creating a digital stream contents by a computer which can communicate with an encoding computer comprising an encoding means having a function to convert a stream signal to a digital stream data comprises:

in accordance with predetermined operations, sending a first order to the encoding computer, the first order being an order to create a new data file in respect to the encoding computer, and to record a digital stream data obtained by encoding an input stream signal by the encoding means between the time of receiving the first order until receiving a subsequent first order, in the generated data file; and sending a second order to the encoding computer, the second order being an order to record identifying information of the generated data file according to its generated order in an administration file.

In the invention, the second order may further include an instruction to record identifying information of an object data to be shown in synchronization with the proceeding of an input stream in relation with a corresponding time code, in the administration file.

Further, a method for creating a digital stream contents by a computer which can communicate with an encoding computer comprising an encoding means having a function to convert a stream signal to a digital stream data comprises:

sending a first order to obtain a time code at a present time, in accordance with a predetermined operation to the encoding computer; and sending a second order to record the obtained time code in an administration file to the encoding computer.

In the invention, the second order may further include an instruction to record identifying information of an object data which is to be shown in synchronization with the proceeding of an input stream signal, in relation with identifying information of a corresponding data file, in the administration file.

Further, the method of the invention may further comprise sending an order to the encoding computer, the order including sending the administration file and the data file to a pre-determined distributing server.

The invention also regards a digital stream contents creating system which implements the method, a computer program product for creating digital stream contents for enabling a computer to implement the method, a computer-readable medium storing the computer program, and a computer program data signal embodied in a carrier wave and representing sequences of instructions which cause the processor to implement the method.

Further, a method for distributing a digital stream contents comprises:

specifying a digital stream data file to be distributed and a distribution order with reference to the administration file; and distributing the specified digital stream file in the specified order.

Further, according to the invention, a method for distributing a digital stream contents comprises:

specifying respective time codes corresponding to a starting and an ending time of a digital stream data file to be distributed and a distribution order with reference to the administration file; and distributing the digital stream data in between the specified two time codes in the specified order.

Further, according to the invention, a method for distributing a digital stream contents comprises:

specifying the digital stream data file to be distributed and a distribution order with reference to the administration file;

distributing the specified digital stream file in the specified order; and distributing an object data related to the digital stream file in synchronization with distribution of each the digital stream file.

Further, the method of the invention may further comprise:

specifying respective time codes corresponding to a starting and an ending time of a digital stream data to be distributed and a distributing order with reference to the administration file;

distributing the digital stream data in between two of the specified time codes in the specified order; and distributing an object data related to the relevant time code in synchronization with distribution of each the digital stream data.

BRIEF DESCRIPTION OF DRAWINGS

Embodiments of the present invention will now be described by way of further example only and with reference to the accompanying drawings, in which:

FIG. 3 is a diagram showing the relation of a scene of a moving image, an operation timing of each button, and a file name of a moving image file generated according to the operation timing, and the like;

FIG. 6 is a diagram of an example of an administration file;

BEST MODE FOR CARRYING OUT THE INVENTION

Figure 1:
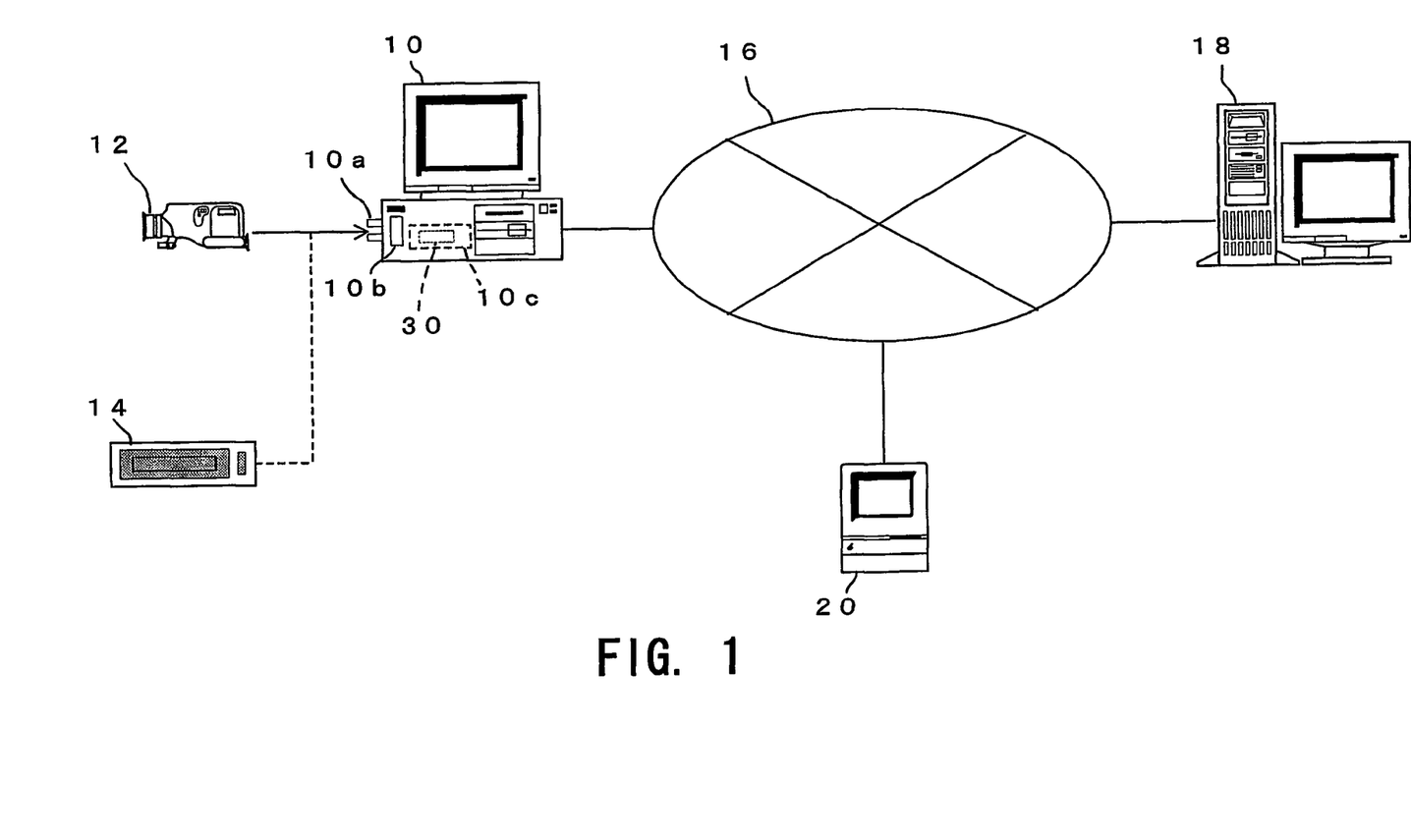
FIG. 1 is an entire structural diagram of an embodiment of the present invention.

FIG. 1 is a structural diagram of an entire system according to an embodiment of the present invention. As shown in FIG. 1, the system of this embodiment comprises a processing computer 10. The processing computer 10 is provided with an input terminal 10a of an audio/video signal (hereinbelow, referred to as "AV signal"), and this input terminal 10a is inputted with an AV signal from a video camera 12 or a video tape recorder (VTR) 14. The processing computer 10 comprises an encoder 10b for converting the AV signal to data in a predetermined moving image format (for example, Windows Media™ format or Real Media format), and may convert the AV signal inputted to the input terminal 10a into a moving image data in real time by the encoder 10b.

The processing computer 10 is connected to the Internet 16, and as described below, may upload such as a moving image file to a moving image distribution server 18 in the Internet 16. The moving image distribution server 18 distributes moving images based on such as moving image files uploaded from the processing computer 10, to a user computer 20 which is accessing to the server 18 via the Internet 16.

A storage device of the processing computer 10, such as a hard disk drive 10c, is installed with a moving image editing program 30. The moving image editing program 30 is installed from a storage medium, for example, a floppy disk, a CD-ROM, a DVD-ROM, or the like, to the hard disk drive 10c. However, a moving image editing program 30 may be downloaded to the processing computer 10 via a network and installed to the hard disk drive 10c. By running the moving image editing program 30 in the processing computer 10, moving image files can be edited and created, as described below. Note that, in this embodiment, an example in a case a moving image file is generated from AV signals containing moving images captured from the scene of a conference is described.

Figure 2:
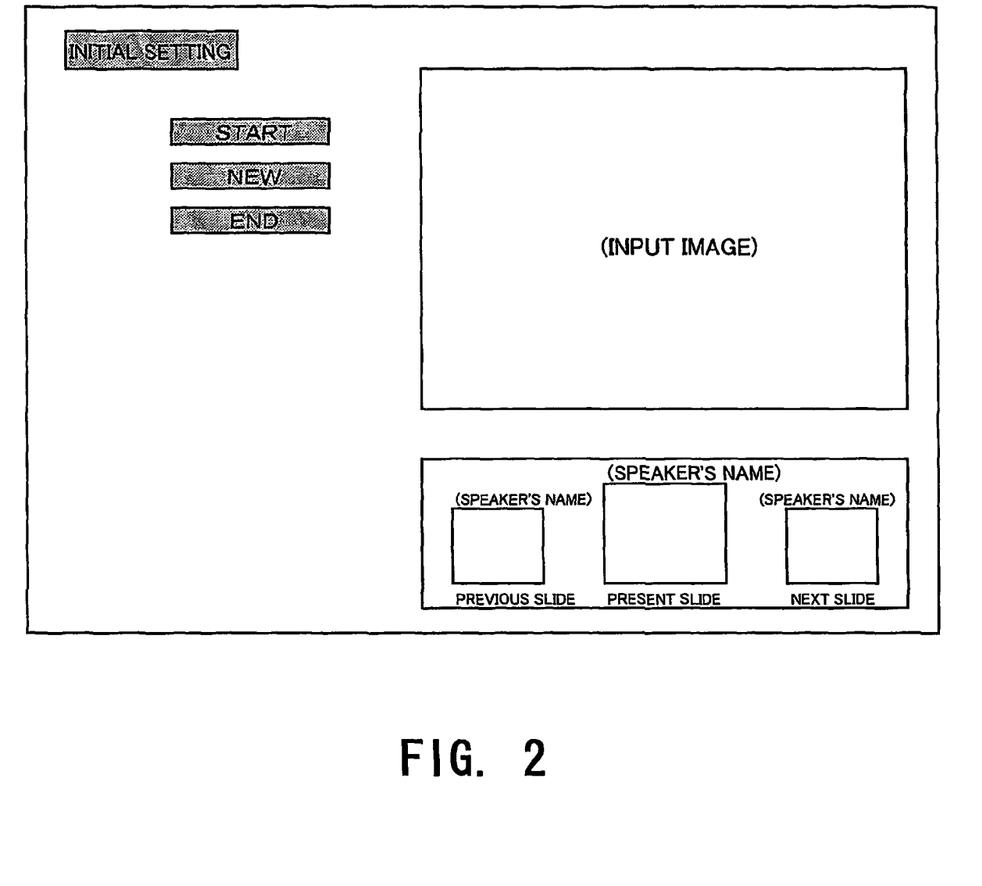
FIG. 2 is a diagram showing an editing screen which is displayed by starting a moving image editing program.

When the moving image editing program 30 is started in the processing computer 10, an editing screen as shown in FIG. 2 is displayed. As shown in FIG. 2, the editing screen includes such as an image display region for displaying the AV signal inputted to the input terminal 10a in real time, slide display regions for displaying slide pictures corresponding to the respective scenes of an image, an "initial setting" menu button, and the respective operation buttons of "START", "NEW", and "END".

When the "initial setting" menu button is clicked, an initial setting screen for conducting various initial settings is displayed. On this initial setting screen, various settings may be conducted, such as setting of encoding conditions such as bandwidth, image quality, and speech quality, setting of a base file name (a file name to be the base when automatically generating a file name of a generated moving image file), creating and editing of a speaker order setting file registering the names of speakers who appear in the image in order of their appearance, creating and editing of slide specifying files registering slides to be displayed corresponding to each speaker, and setting of automatic uploading option (an option of whether or not a moving image file is automatically uploaded to the moving image distribution server 18 when creation of a moving image file is completed). Note that, the user may, for example, obtain in advance a plan of an agenda of a conference, and based on this plan of the agenda of the conference may create a speaker order setting file and a slide specifying file. Further, a predetermined directory within the hard disk drive 10c stores a slide data file (slide picture file) of each slide file name registered in the slide specifying file.

In the above editing screen, when the "START" button is clicked, the encoded moving image data starts to be recorded to a moving image file by the encoder 10b. Further, when the "NEW" button is clicked, the moving image file currently recording data is closed, and moving image data from then on is recorded in a moving image file with a new file name. Note that, the moving image file name is automatically generated, for example, in a format of a combination of a base file name set in the above initial setting and a continuous number. Further, a time code at a point in time the "NEW" button is clicked is obtained from an encoded moving image data.

When the "END" button is clicked, the moving image file which is being created at this point in time is closed. Further, a speaker name and a corresponding slide file name are read successively from the speaker order setting file and the slide specifying file, and these are additionally recorded in an administration file with the corresponding time code and the moving image file name. In a case the automatic uploading option is selected, a generated moving image file, an administration file, and a slide data file are automatically uploaded by a protocol such as FTP to the moving image distribution server 18.

Figure 3:
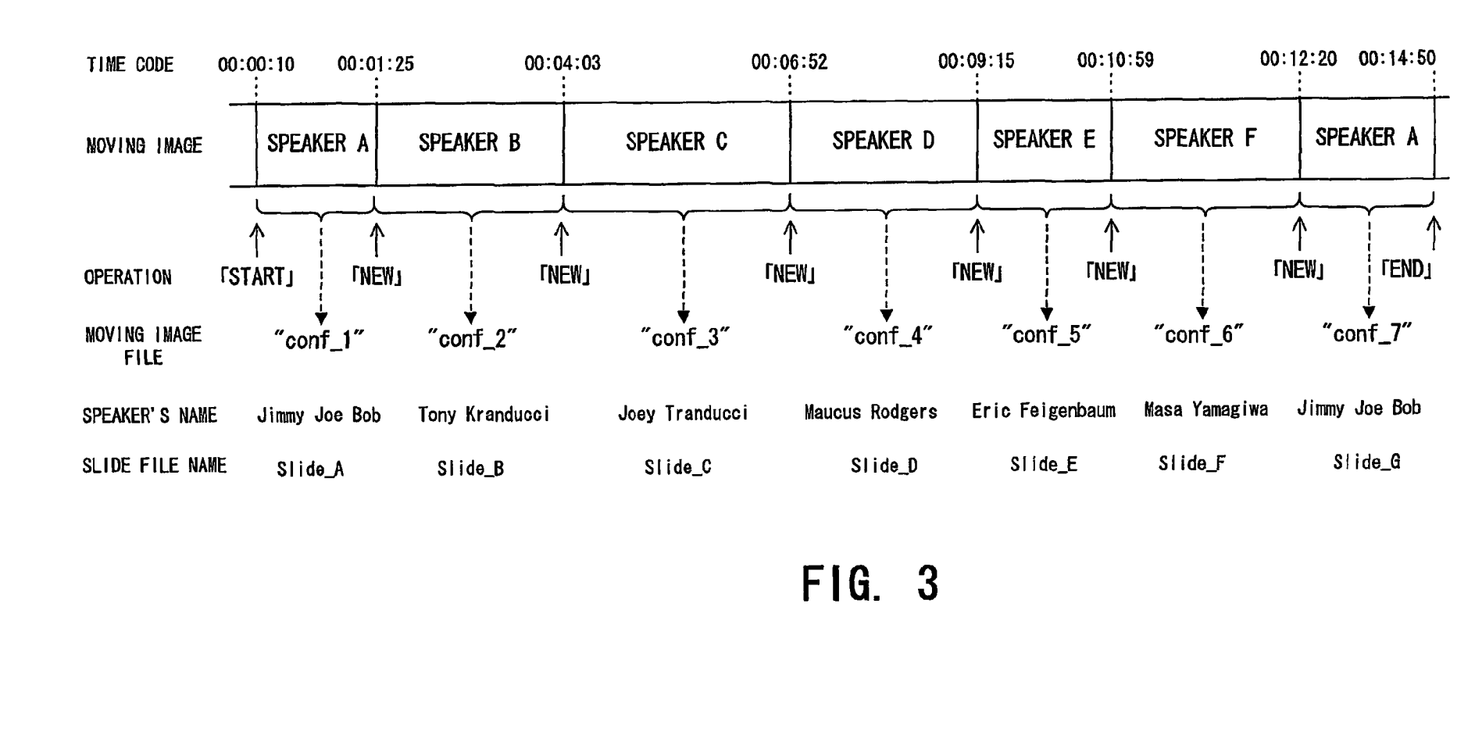

FIG. 3 shows the relationship of a scene of a moving images, an operation timing of each button, and file names of moving image files generated accordingly. Note that, FIG. 3 shows an example in a case a moving image file is generated from an image captured from the scene of a certain conference, and a file of a content shown in FIG. 4 and FIG. 5 are to be generated in advance as the speaker order setting file and the slide specifying file.

In the example shown in FIG. 3, "conf" is specified as a base file name, and when the "START" button is clicked, the first moving image file "conf_1" is created. Thereafter, every time the "NEW" button is clicked at the time of changing speakers, from then on moving image data until a "NEW" button (or the "END" button) is clicked is recorded in new moving image files "conf_2", and "conf_3". Then, after the "END" button is clicked, the speaker name and the slide file name are subsequently read from the speaker setting file and the slide setting file, and they are recorded in the administration file with the moving image file name and the time code. Note that, recording to the administration file may be conducted every time a new moving image file is generated by clicking the "START" or the "NEW" button.

Figure 4:
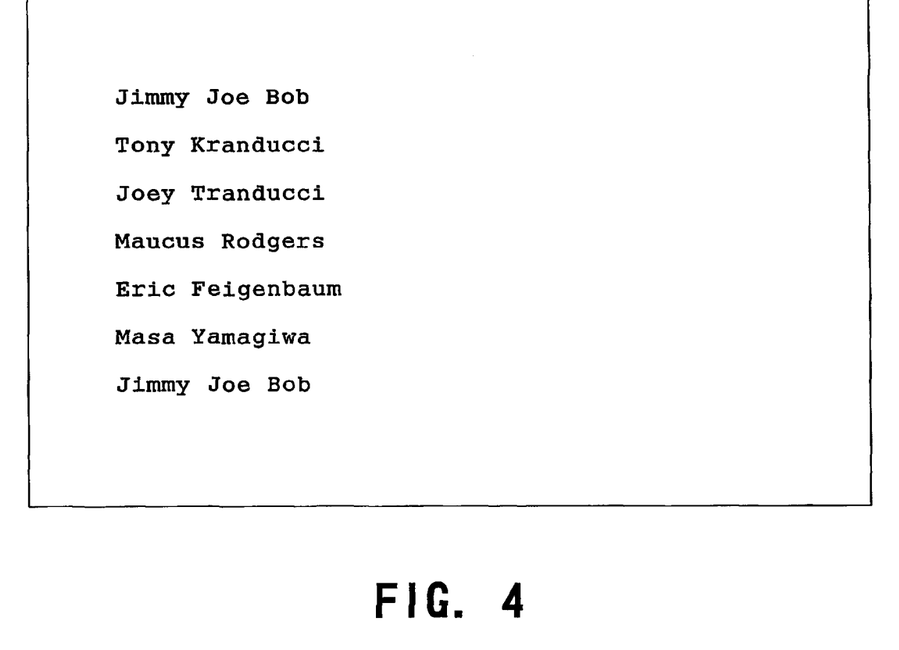
FIG. 4 is a diagram showing an example of a speaker order setting file.
Figure 5:
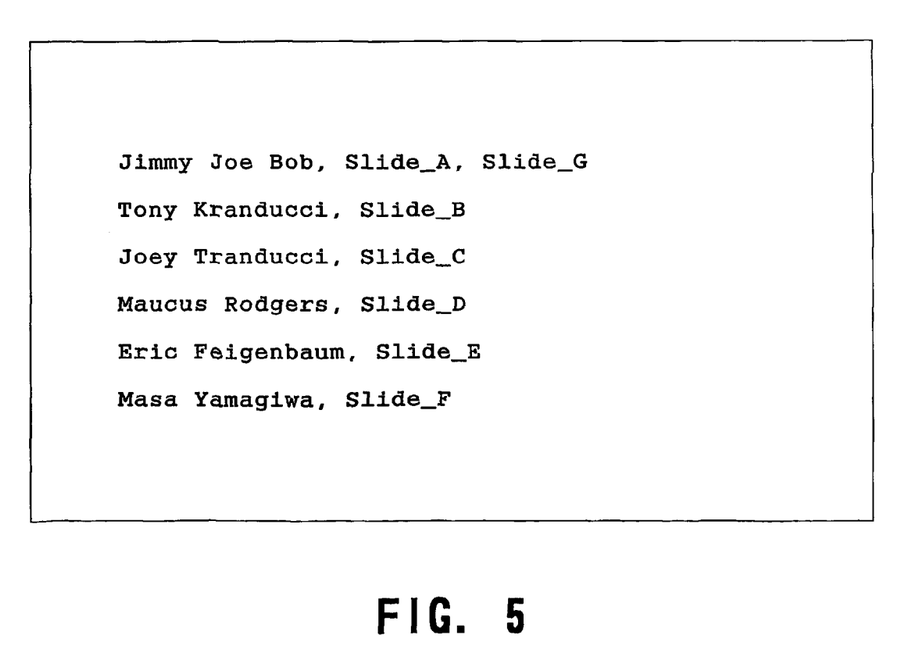
FIG. 5 is a diagram showing an example of a slide specifying file.

Further, in the example shown in FIG. 3, two slide files "Slide_A" and "Slide_F" are used in respect to a speaker "Jimmy Joe Bob", and corresponding thereto, in the example of the slide specifying file shown in FIG. 4, these two slide file names are listed in the order of use for the speaker "Jimmy Joe Bob". In this way when a plurality of slide files are used in respect to the same speaker, each slide file name is recorded in order of use corresponding to the speaker. However, the method of writing to the slide specifying file is not limited thereto, and for example, similarly to the speaker order setting file, the slide file name to be used may be recorded in order of use. In short, a data structure is required such that a slide file used in each scene can be specified.

FIG. 6 is a diagram showing the content of the administration file. An example of an administration file generated in the example shown in FIG. 3 is specifically shown. In this embodiment, as shown in FIG. 6, the administration file is written in XML (extensible Markup Language), and is structured, with a <session> element surrounded by a tag <session>-</session> as a route element, comprising one <setting> element surrounded by tag <setting>-</setting> and a plurality of <event> elements surrounded by tag <event>-</event>. The <setting> element is an element describing such as a data format and a date of creating a moving image file. Further, each <event> element is an element corresponding to each scene separated by clicking the "START" or the "NEW" button, and is respectively structured by such as a <filename> element describing a moving image file name, a <timecode> element showing a time code of a scene starting time, a <speaker> element showing speakers appearing in the image of the corresponding moving image file, and a <slidetitle> element describing the file name of a slide to be displayed in each scene.

Figure 7:
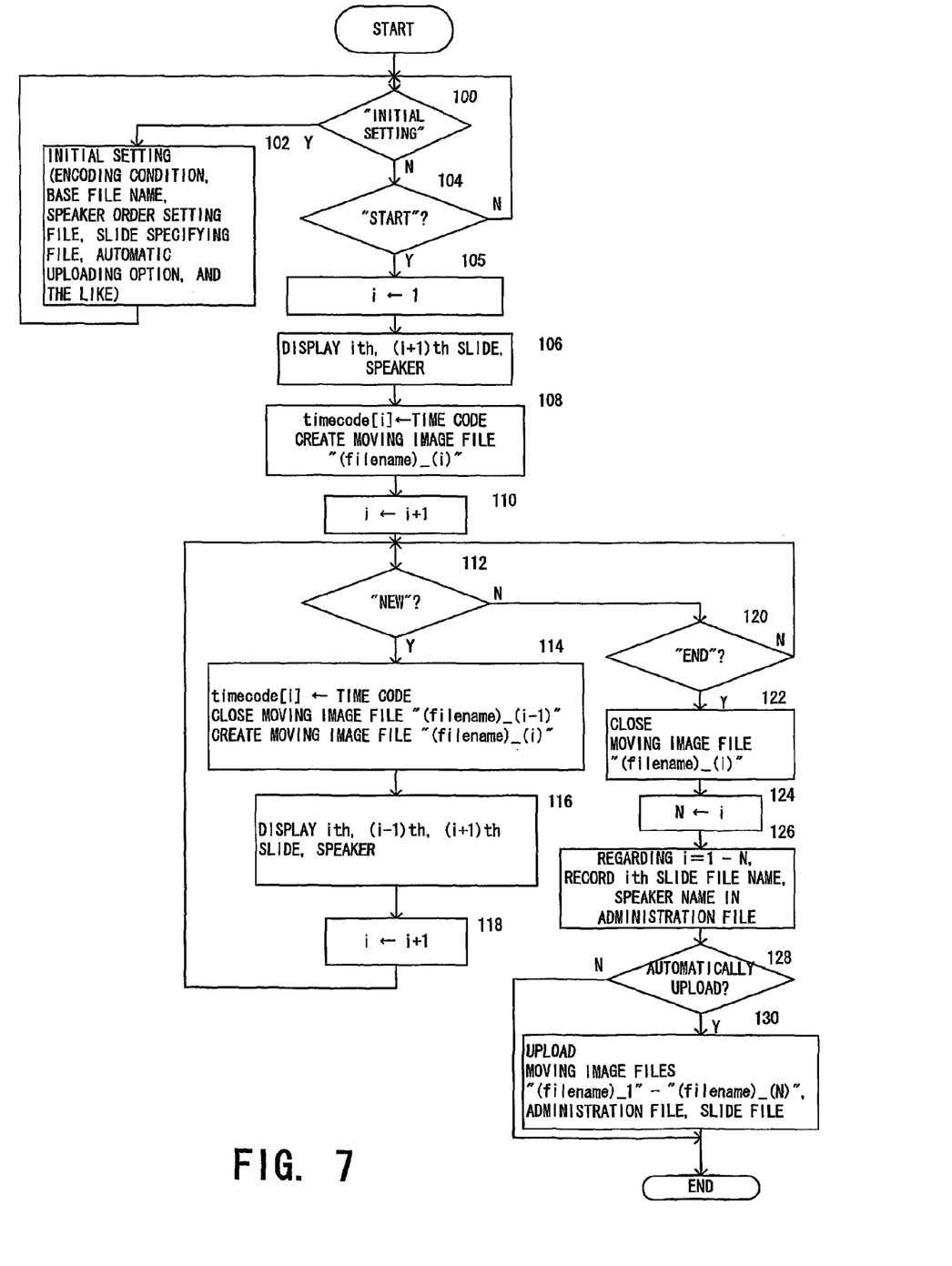
FIG. 7 is a flowchart showing a flow of a process of the moving image editing program.

FIG. 7 is a flowchart showing the flow of the process of the moving image editing program 30 described above. As shown in FIG. 7, when the "INITIAL SETTING" menu button is clicked first (S100), the initial setting screen is displayed, thus initial setting of such as an encoding condition, a base file name, a speaker order setting file, a slide specifying file, and an automatic uploading option is performed (S102). On the other hand, when the "START" button is clicked (S104), a counter variable i is first initialized to 1 (S105). Next, the speaker order setting file and the slide specifying file are referred to, and the ith (first) and the (i+1)th (second) speaker names and corresponding speaker file names are obtained, and the slide data of the obtained slide file names and the speaker names are displayed in the slide display region (S106). Further, a time code at the present time is obtained and stored in the variable "timecode [i]," and a new moving image file (file name: "(base file name)_(i)" is generated, and from then on the encoded moving image data is recorded in this moving image file (S108). Then, the value of the counter i is increased by just 1 (S110).

After the creating of the moving image data file is started as described above, and the "NEW" button is clicked (S112), the time code at that point in time is obtained and stored in the variable "timecode [i]," and further, the moving image file currently recording data (file name: "(base file name)_(i−1)") is closed, and a new moving image file (file name: "(base file name)_(i)") is generated. From then on, this moving image file records moving image data which is encoded after the "NEW" button is clicked (S114).

Next, the speaker order setting file and the slide specifying file are referred to and the ith, (i−1)th, and (i+1)th speaker names and the corresponding slide file names are obtained, and the slide data of the obtained slide file name is displayed with the speaker name in the slide display region (S116). Then, the value of i is increased by just 1 (S118), and the "NEW" button (or the "END" button) waits to be clicked again.

On the other hand, when the "END" button is clicked (S120), a file of the moving image file currently recording data (file name: "(base file name)_+(i)") is closed (S122). Then, the present value of i (namely, the number of created moving image files) is stored as a variable N (S124), and in respect to i=1–N, a time code timecode[i], the ith speaker name, and the ith slide file name are recorded in the administration file (S126). Then, when the automatic uploading option is selected (S128), the created N moving image files (file name: "(base file name)_1"-"(base file name)_(N)"), the administration file, and the slide data file are uploaded to the moving image distribution server 18 by FTP or the like (S130).

Next, the process at the moving image distribution server 18 to which the respective moving image files and the administration file created as above are uploaded, is explained.

The moving image distribution server 18 prepares a web page screen data for distributing moving image files uploaded from the processing computer 10. This web page screen data includes such as a moving image distributing program for distributing moving images (or a link to the moving image distribution program) and an order for starting a program for moving image playback in the user computer 20 which is accessing thereto.

The moving image distribution program is described by, for example JavaScript™ and the like, and the program has a function of sending each moving image file to a user computer 20 in a specified order, and in a case a slide file name is specified corresponding to each moving image file name in the administration file, sending the corresponding slide file to the user computer 20 in synchronization with sending the moving image file. For example, in a case the content of the administration file is as shown in FIG. 6, and moving images regarding the third speaker "Joey Tranducci" is not to be distributed, the distributing order should be specified as "1, 2, 4, 5, 6, 7." Then the moving image file is sent to the user computer 20 in the order of "conf_1", "conf_2", "conf_4" "conf_5", "conf_6", "conf_7", and slide files are sent in the order of "Slide_A", "Slide_B", "Slide_D", "Slide_E", "Slide_F", "Slide_G", in synchronization with these moving image files.

Note that, specifying for activating the moving image playback program is conducted by for example, an <object> tag in HTML statement, and a playback program corresponding to the format of the moving image to be distinguished (for example, Windows Media™ Player in a case the moving image data is in Windows Media™ format) is specified.

When there is an access from the user computer 20 to a URL of the above moving image distributing web page screen data, this web page screen data is sent to the relevant user computer 20. Thus, in the user computer 20, the moving image playback program is started, the moving image files sent from the moving image distribution server 18 are subsequently played back, and when slide data is sent, such slide picture is displayed in synchronization with the moving image which is played back.

Figure 8:
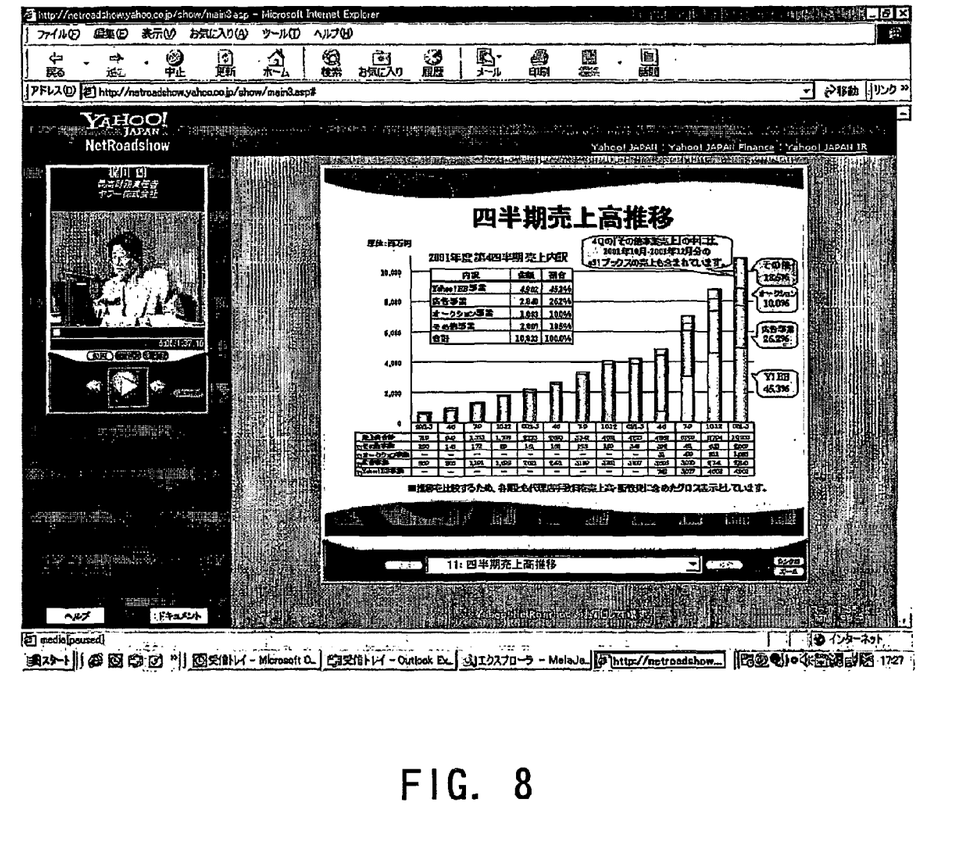
FIG. 8 is an example of a display screen of a user computer receiving moving image distribution.

FIG. 8 is an example of a display screen of the user computer 20 which is receiving moving images distributed as described above FIG. 8 shows an example of distributing the scene of a briefing of a company's account settlement, and displays the moving image of a presenter at the left side of the screen and a slide picture at the right side of the screen, respectively.

As described above, according to the system of this embodiment, an image of an inputted AV signal is monitored, and with a simple operation of clicking the "NEW" button at a separation of a scene (for example, at the time the speakers change), a moving image file corresponding to each screen may be created and an administration file recording a file name of each moving image file can be created. For this reason, in the moving image distribution server 18 which has uploaded the moving image files, just by specifying the distributing order of these moving image files, a moving image data edited to a desired content can be distributed.

Further, the slide file name corresponding to each moving image file is read from the slide specifying file and automatically recorded to the administration file, and the moving image distribution server 18 refers to this administration file and automatically distributes slide data in synchronization with the proceeding of the moving image. For this reason, in the case of such as a presentation using a slide, by just registering the slide file name in the slide specifying file, the moving image and the slide picture can be easily distributed in synchronization with each other.

Note that, in the above embodiment, every time the "NEW" button is clicked, a new moving image file is created and the video image is split to different moving image files for every scene, but the entire video image which is inputted may be stored in a single moving image file, without splitting the moving image file. As described above, the administration file is recorded with a time code at the time each scene is switched, and by referring to the time code included in the moving image data, the moving image data at an arbitrary point in time in the moving image file may be easily accessed. Therefore, by merely recording the time code which is a split in the scenes in the administration file, the moving image data of a desired interval may be extracted based on this time code and sent to the user computer 20.

Further, in the above embodiment, the administration file subsequently records such as the file name of each moving image file which is generated, the corresponding speaker's names and slide file names, or the like, and the moving image distributing program in the moving image distribution server 18 specifies which moving image file is distributed in what order. However, information for specifying the moving image files to be distributed and their order may be recorded in the administration file, and the moving image distributing program may distribute moving images according to this information.

Further, in the above embodiment, assuming that the order of speakers is known in advance, the speaker order setting file and the slide specifying file are created before the moving image file is created, and the administration file is automatically generated at the time of creating the moving image file. However, without being limited to the above, after the moving image file is created, the speaker order setting file and the slide specifying file may be created, and according to their contents, the speaker name and the slide file name may be recorded in the administration file. Alternatively, the user may directly edit the administration file, and input the speaker name and the slide file name.

Further, in the above embodiment, explanation has been made for a case where moving images are distributed as a digital stream contents, and the slide data is distributed in synchronization with the moving images. However, the present invention is not limited to the above, and is applicable to a case of distributing audio signals as a digital stream contents. Further, as an object which is in synchronization with the digital stream contents, other than slides, arbitrary objects may be used such as, stream data such as a different moving image or audio, an animation, or a web page.

Figure 9:
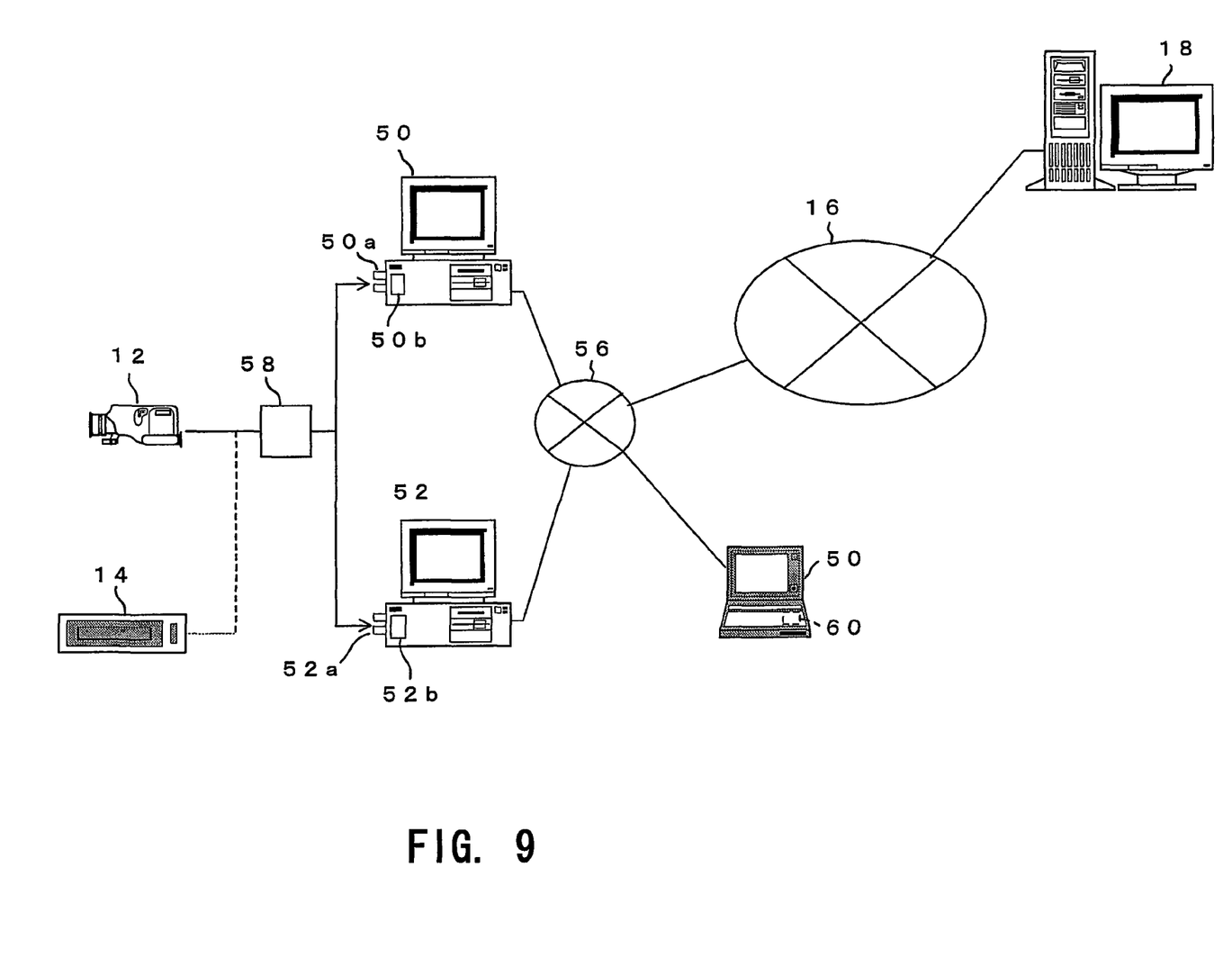
FIG. 9 is an entire structural view of a system according to another embodiment of the present invention.

Next, another embodiment of the present invention is explained. FIG. 9 is a structural diagram of a system of this embodiment. In this embodiment, there are separately provided, encoding computers 50, 52 for encoding the moving image data, an editing computer 54 for editing operations of moving image, and they may communicate with each other via the LAN 56. This LAN 56 is connected to the Internet 16. A video signal from a video camera 12 or a video tape recorder 14 is inputted to A/V input terminals 50a, 52a of the encoding computers 50, 52 via the AV distributor 58. The encoding computers 50, 52 comprise encoders 50b, 52b which conduct encoding in a moving image format different to each other (for example, Windows Media™ or Real Media).

In this embodiment, the editing computer 54 is installed with a moving image editing program 60. When the moving image editing program 60 is started, an editing screen similar to the moving image editing program 30 in the first embodiment is displayed. Then, when the respective operation buttons of "START", "NEW", and "END" included in this screen are clicked, the corresponding processes such as an encoding process, a process of generating the moving image files, a process of generating an administration file, a process of uploading data to the moving image distribution server 18, and the like are not executed in the editing computer 54, but an order to conduct a relevant process is sent to the encoding computers 50, 52 via the LAN 56, and the actual processes are conducted by the encoding computers 50, 52.

In this way by separating the encoding computers 50, 52 and the editing computer 54 and connecting them by the LAN 56, even with a computer which does not have a moving image encoder, it becomes possible to edit a moving image by just connecting to the LAN 56.

Note that, in the example shown in FIG. 9, two encoding computers 50, 52 are provided in order to handle the two kinds of moving image formats, but without limiting to the above, one or three or more encoding computers may be provided corresponding to one or three kinds of moving image formats.

As described above, according to the present invention, a digital stream contents which may conduct distribution in a network may be created by a simple operation.

Further, by recording an identifying information of an object data in relation with each time code and an identifying information of a file, distribution of the object data may be conducted in synchronization with the stream contents.

The invention claimed is:

1. A method of creating digital stream contents comprising:
    a processing computer receiving an input stream signal comprising at least one of an audio signal and a video signal;
    the processing computer encoding the input stream signal to provide digital stream data;
    in accordance with a plurality of predetermined user inputs, the processing computer recording a plurality of time-sequential portions of the digital stream data in a corresponding plurality of data files, each of the plurality of data files storing the digital stream data from an occurrence of each of said plurality of predetermined user inputs until a subsequent occurrence of the predetermined user input;
    the processing computer recording identifying information of the plurality of data files in order of generation in an administration file; and
    the processing computer sending the administration file and the plurality of data files to a predetermined distribution server.

2. The method of claim 1, further comprising:
    the processing computer obtaining a time code at a time of each of the plurality of predetermined user inputs; and
    the processing computer recording each time code in the administration file in association with the identifying information of the corresponding data files.

3. The method of claim 2, further comprising:
    the processing computer recording identifying information of an object data to be shown in synchronization with a corresponding data file, in relation with a corresponding time code, in the administration file.

4. The method of claim 1, further comprising;
    the processing computer recording identifying information of object data to be shown in synchronization with a corresponding data file, in association with identifying information of the corresponding data file, in the administration file.

5. The method of claim 4, wherein the identifying information of object data is a slide title extracted from a slide specifying file prepared before the data files are recorded.

6. The method of claim 1, further comprising:
    recording a speaker name associated with at least some of the plurality of data files in the administration file.

7. The method of claim 6, wherein each speaker name is extracted from a speaker order setting file prepared before the data files are recorded.

8. The method of claim 1, wherein the input stream signal is one of an audio signal, a video signal, and an audio/video signal.

9. A method of creating digital stream contents by an editing computer which can communicate with an encoding computer, the method comprising:
    in accordance with a plurality of predetermined user inputs, the editing computer sending a corresponding plurality of first orders to the encoding computer, each first order instructing the encoding computer to create a new data file, and to record a digital stream data obtained by encoding an input stream signal between the time of receiving the first order until receiving a subsequent first order, in the data file;

the editing computer sending a second order to the encoding computer, the second order instructing the encoding computer to record identifying information of the data files corresponding to the plurality of first orders in an administration file; and the editing computer sending a third order to the encoding computer, the third order instructing said encoding computer to send the administration file and the data files to a predetermined distribution server.

10. The method of claim 9, wherein:

each first order further instructs the encoding computer to obtain a time code at a present time; and the second order further instructs the encoding computer to record obtained time codes corresponding to the plurality of first orders in the administration file.

11. The method of claim 10, wherein the second order further instructs the encoding computer to record identifying information of an object data to be shown in synchronization with a corresponding data file in relation with the corresponding time code, in the administration file.

12. The method of claim 9, wherein the second order further instructs the encoding computer to record identifying information of an object data which is to be shown in synchronization with a corresponding data file, in relation with identifying information of the corresponding data file, in the administration file.

13. A method for distributing digital stream content, comprising:

storing a plurality of digital stream data files in a distribution server, the plurality of digital stream data files containing respective time-sequential portions of an encoded input stream signal;

storing an administration file containing identifying information of the plurality of digital stream data files in the distribution server;

specifying one or more of a plurality of digital stream data files to be distributed and a distribution order to the distribution server with reference to the administration file;

the distribution server distributing the one or more specified digital stream data files in the specified distribution order; and the distribution server distributing an object data related to one of the specified digital stream data files in synchronization with distribution of the related digital stream data file.

14. A method for distributing digital stream content, comprising:

storing a plurality of digital stream data files in a distribution server, the plurality of digital stream data files containing respective time-sequential portions of an encoded input stream signal;

storing an administration file containing identifying information of the plurality of digital stream data files in the distribution server, the administration file including time codes corresponding to the start time of each of the plurality of digital stream data files;

specifying one or more of a plurality of digital stream data files to be distributed and a distribution order to the distribution server with reference to the administration file; and the distribution server distributing the one or more specified digital stream data files in the specified distribution order, wherein:

specifying one or more digital stream data files to be distributed comprises specifying a starting and an ending time, and distributing the one or more specified digital stream data files comprises distributing digital stream data files having start times between the starting time and the ending time.

15. The method of claim 14, further comprising:

distributing an object data related to a time code between the starting time and the ending in synchronization with distribution of a corresponding digital stream data file.

16. A system for creating digital stream contents, comprising:

a distribution server; and a processing computer including:

an interface to receive an input stream signal;

an encoder to encode the received input stream signal into digital stream data; and a storage device storing instructions which, when executed, cause the processing computer to perform actions comprising:

in accordance with a plurality of predetermined user inputs, recording a plurality of time-sequential portions of the digital stream data in a corresponding plurality of data files, each of the plurality of data files storing the digital stream data from an occurrence of the predetermined user input until a subsequent occurrence of a predetermined user input;

recording identifying information of the plurality of data files in order of generation in an administration file; and sending the administration file and the plurality of data files to the distribution server.

17. The system of claim 16, the actions performed further comprising:

obtaining a time code at a time of each of the plurality of predetermined user inputs; and recording the obtained time codes in the administration file in association with the identifying information of the corresponding data files.

18. The system of claim 17, the actions performed further comprising:

recording identifying information of an object data to be shown in synchronization with a corresponding data file, in relation with a corresponding time code, in the administration file.

19. The system of claim 16, the action performed further comprising:

recording identifying information of object data to be shown in synchronization with a corresponding data file, in association with identifying information of the corresponding data file, in the administration file.

20. The system of claim 16, wherein each predetermined user input comprises clicking a button on an editing screen displayed by the processing computer.

21. The system of claim 16, further comprising:

an editing computer in communications with the processing computer, wherein each predetermined user input comprises clicking a button on an editing screen displayed by the editing computer, and the editing computer sends an order to the processing computer in response to each predetermined user input.

22. A computer-readable storage medium storing instructions which, when executed, cause a computing device to perform operations comprising:

encoding a received input stream signal into digital stream data;

in accordance with a plurality of predetermined user inputs, recording a plurality of time-sequential portions of the digital stream data in a corresponding plurality of data files, each of the plurality of data files storing the digital stream data from an occurrence of the predetermined user input until a subsequent occurrence of the predetermined user input;

recording identifying information of the plurality of data files in order of generation in an administration file; and sending the administration file and the plurality of data files to a predetermined distribution server.

23. The computer-readable storage medium of claim 22, the actions performed further comprising:

obtaining a time code at a time of each of the plurality of predetermined user inputs; and recording the obtained time codes in the administration file in association with the identifying information of the corresponding data files.

24. The computer-readable storage medium of claim 23, the actions performed further comprising:

recording identifying information of an object data to be shown in synchronization with a corresponding data file, in relation with a corresponding time code, in the administration file.

25. The computer-readable storage medium of claim 22, the actions performed further comprising:

recording identifying information of object data to be shown in synchronization with a corresponding data file, in association with identifying information of the corresponding data file, in the administration file.

\* \* \* \* \*